United States Patent

[11] 3,580,258

[72] Inventors Clark E. Stroburg;
Eldon L. Stroburg, Blockton, Iowa 50836
[21] Appl. No. 796,749
[22] Filed Feb. 5, 1969
[45] Patented May 25, 1971

[54] COMBINE
5 Claims, 4 Drawing Figs.
[52] U.S. Cl. ................................................ 130/27HF
[51] Int. Cl. .................................................. A01f 12/48
[50] Field of Search ........................................ 130/27,
27.3, 27.6, 27.12, 27.14, 27.8, 27.8 (F), 27.2;
230/128; 415/206

[56] References Cited
UNITED STATES PATENTS
| | | | |
|---|---|---|---|
| 2,005,212 | 6/1935 | Wickersham | 130/27.2 |
| 2,612,742 | 10/1952 | Heth | 130/27 |
| 2,849,118 | 8/1958 | Ashton | 130/27.8 |
| 3,213,857 | 10/1965 | Ashton et al. | 130/27.8 |

FOREIGN PATENTS
| | | | |
|---|---|---|---|
| 116,171 | 12/1942 | Australia | 130/27.8 |

Primary Examiner—Antonio F. Guida
Attorney—Morton S. Adler

ABSTRACT: An airflow system for a combine harvester to more effectively float and carry away the straw and chaff and thus increase the efficiency of the separating and cleaning mechanism which includes strawwalkers and a cleaning shoe as is well known. This invention is designed for combines using a concave grate in relation to the threshing cylinder and includes air intake fans mounted to opposed sides of the housing to induce and direct a flow of air upwardly through the grate and over the strawwalkers and out of the machine at the rear and also over the conveyor below the grate rearwardly up the trough below the strawwalkers and then upwardly through the walkers to float the chaff and straw without preventing the heavier grain on the conveyor from reaching the cleaning shoe or the grain on the walker from falling through the openings therein onto the trough for delivery by gravity to the cleaning shoe mechanism. Preferably, two opposed streams of air are generated which impact intermediate the grate and the conveyor whereby a portion of the deflected airstream passes upwardly through the grate, over the strawwalkers and out of the rear of the machine with the rest of the deflected airstream passing up the trough, then upwardly through the strawwalkers and out of the machine at the rear. The speed of such fans may be selectively varied and likewise control means are provided for the volume of intake air.

Patented May 25, 1971

INVENTORS.
CLARK E. STROBURG
ELDON L. STROBURG

BY Morton S. Adler
ATTORNEY.

Patented May 25, 1971  3,580,258

INVENTORS.
CLARK E. STROBURG
ELDON L. STROBURG

BY
ATTORNEY.

Patented May 25, 1971

INVENTORS.
CLARK E. STROBURG
ELDON L. STROBURG

BY
ATTORNEY.

COMBINE

BACKGROUND OF THE INVENTION

1. Field of the Invention

This invention relates to an airflow system for a combine harvester to improve the efficiency of the separating mechanism in the separation of the straw and chaff from the grain.

2. Description of the Prior Art

Combines, of course, are old and well known and while they are available in various designs and models, they perform the basic functions of harvesting, threshing and cleaning the grain. One type of combine as exemplified in U.S. Pat. No. 2,937,647 moves the crop from a threshing cylinder onto a conveyor of the raddle type having a bottom pan which prevents any material from falling therethrough so that said material can be delivered onto the strawwalkers which comprise a series of oscillating elements as is well known in the part. The strawwalker contains suitable openings through which the heavier grain and smaller size chaff is sifted through as the larger pieces of straw and chaff are carried away and the sifted material then passes downwardly in a trough below the strawwalker to what is known as the cleaning shoe where further separation of the chaff is effected and the grain can be delivered to a storage receptacle. Tailings material is returned to the threshing cylinder in a well-known manner.

The combine shown in this application is of a different, but well-known type in which the bulk of the threshed material passes directly from the threshing cylinder through a concave grate onto a conveyor for direct delivery to the cleaning shoe. Only a minor portion of the threshed material including the larger straw and chaff incapable of passing through the grate is propelled by the cylinder onto the strawwalkers and is delivered by means of the walker trough to the cleaning shoe.

The object of the separating and cleaning mechanism is, of course, to remove as much of the straw and chaff as possible from the grain but not infrequently in the combine of the type here disclosed, considerable amounts of fine chaff will be present which tends at times to form a heavy mat on the cleaning shoe and also to clog the strawwalkers so that the efficiency of the separating and cleaning mechanism is seriously affected.

The concept of providing a flow of air for blowing the lighter straw and chaff without affecting the fall of the heavier grain is not new and a fan mechanism has long been regularly used in combine machines with the cleaning shoe mechanism. Also in U.S. Pat. No. 2,937,647, mentioned previously, a second fan is shown below the closed bottom raddle conveyor to direct air toward the strawwalkers and from the structure shown, such air would appear to move primarily over such walkers. Mention is made that some airflow is also upwardly through the walker but due to the adjustment of the walker which is the primary concern of said patent, the amount of air passing below the walkers would appear to be minimal.

Because of the structural design of the combine shown in this application where most of the threshed grain does not reach the strawwalkers, the air system of U.S. Pat. No. 2,937,647 would be ineffective since it would not act upon the major portion of the threshed material moving toward the cleaning shoe from the opposite direction as the material moving toward such shoe from the strawwalker. It is thus one of the primary objects of the present invention to provide an airflow or pressurized area at the point of initial separation of the grain and chaff which is at the area of the concave grate and to more effectively float the chaff and grain over a more effective area and time period so as to increase the efficiency of the separating and cleaning mechanism of the machine.

SUMMARY

The present invention is an improvement for a combine harvester of the type wherein the crop gathering mechanism delivers the crop to a threshing cylinder beneath which there is mounted a concave grate. Such cylinder is of the type designed to effect the bulk of the separation of the threshed material which will fall through the grate onto a conveyor for delivery to a cleaning shoe mechanism. Material which does not fall through the grate is propelled by the threshing cylinder onto a separating mechanism known as the strawwalkers which is a well-known apparatus in the art designed to move the straw rearwardly out of the machine and permit the heavier grain to sift through openings in the walker to a trough by which it is delivered by gravity to the cleaning shoe mechanism which includes an adjustable chaffer and an adjustable sieve in a well-known manner. Tailings material is returned to the threshing cylinder. The combine includes a blower fan associated with the cleaning shoe mechanism for supplying a blast of air at the shoe mechanism to float away the chaff and permit only the clean grain to reach an elevator for delivery to the storage tank. The amount of chaff which can pass through the concave grate will at times be quite substantial and will be delivered with the grain to the cleaning mechanism where it will tend to mat and clog the chaffer and sieve components and more generally the chaffer. Likewise, it is also possible that a considerable amount of fine chaff will sift with the grain through the holes in the strawwalkers and add to the clogging and matting of the cleaning shoe mechanism. To avoid the heavy accumulation of chaff on the cleaning mechanism both from the conveyor and from the strawwalker, we have pressurized the area just below the concave grate in order to create an airflow which will effectively float the straw and chaff out of the machine before it reaches the cleaning shoe mechanism. This is accomplished by mounting intake air fans at opposed sides of the housing of the combine so as to create an air pressure and airflow which passes upwardly through the concave grate and over the strawwalkers and also over the conveyor whereby such airflow, because of the enclosed housing, will of necessity move rearwardly out of the machine. To aid in the effective use of this airflow relative to the strawwalker, we have extended the trough beneath the walker so that the open end is closely adjacent the discharge end of the conveyor and with the enclosed housing sides there is in effect provided an air channel directly into the trough. A portion of such airflow passes rearwardly up the trough and upwardly through the openings in the strawwalker and is sufficient to float the chaff and straw without hindering either the sifting of the heavier grain downwardly through the strawwalker and down the trough into the cleaning shoe or the movement of grain over the conveyor. This air pressure system is particularly effective because it moves both over the conveyor below the concave grate which delivers the bulk of the threshed material to the cleaning shoe from the opposite direction from which grain will be reaching said shoe from the strawwalker and also upwardly through the grate and over the strawwalker where the two streams converge in moving the straw and chaff out of the machine at the rear.

The objects of this invention together with details of the operation outlined and the advantages of the same will be more fully described and developed in relation to the more detailed description of the accompanying drawings.

DESCRIPTION OF THE PREFERRED EMBODIMENT

Figure 1:
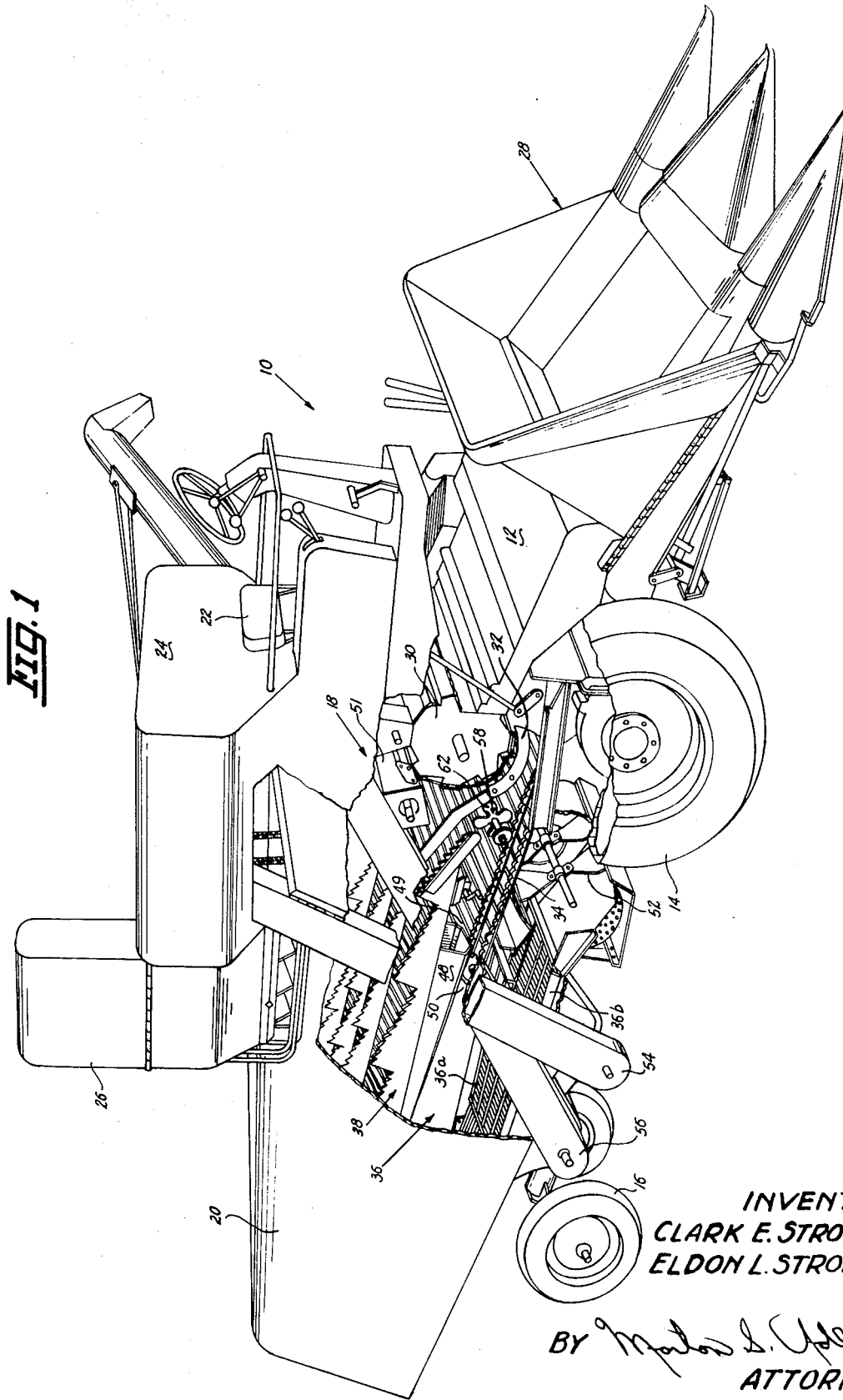
FIG. 1 is a perspective view, partially cut away, to illustrate the type of combine harvester machine with which this invention is used and illustrating one of the fan elements utilized to provide the air flow system with this machine.

Referring to the drawings, the combine machine for which this invention has been designed is designated generally by the numeral 10 and while no invention is claimed in such machine per se, sufficient of the structure thereon has been shown and will be referred to for purposes of a better understanding of the improvement which we shall describe.

Combine 10 includes a suitable frame 12 to which there is mounted the forward driving wheels 14 and the rear wheels 16. Carried by frame 12 intermediate the front and rear wheels is a variety of equipment which will be separately referred to but which can be generally designated as the separating mechanism 18 and which is enclosed by a suitable housing 20. Above the drive wheels is the operator's seat or station 22 from which a grain storage tank 24 extends rearwardly to the engine section 26. Extending forwardly of frame 12 below the operator's seat 22 is the crop gathering apparatus 28 of a well-known structure.

Material gathered through the apparatus 28 is delivered to a rotatable threshing cylinder 30 which acts to separate the grain from the chaff and straw in such a manner that the bulk of such threshed material will fall downwardly through the concave grate 32 located just below cylinder 30. Such material falls onto a conveyor 34 for delivery to the cleaning shoe mechanism designated generally by the numeral 36 and this, of course, includes fine chaff able to pass therethrough. Material which is too large to pass through the grate 32 or does not pass therethrough is propelled by the cylinder 30 onto the separating apparatus which is known as the strawwalkers 38. Such strawwalkers are well known and together with the other machine structure referred to are suitable operatively connected to the engine 26 for operation as is generally well known and for which no invention is here claimed. Generally, the strawwalkers 38 consist of three like sections 40, 42 and 44 which are operatively connected to a crankshaft 46 so that each section rapidly oscillates in such a manner as to move the straw and chaff rearwardly. Sections 40, 42 and 44 include the respective foraminous racks 40a, 42a and 44a flanked by the respective sidewalls 40b, 42b and 44b and extend toward but not to the rearward closed end of housing 20 which is open at the bottom as is well known. The bottom of each section is enclosed by a sheet metal trough 48 which extends from the rear of housing 20 forwardly and downwardly so that the material moves through said trough to the discharge point 49 for delivery onto the cleaning mechanism 36. In the operation of these strawwalkers, the lighter weight straw and larger chaff will be moved rearwardly and the heavier grain together with fine chaff will fall by gravity through the apertures in the racks 40a, 42a and 44a into the respective troughs 48. In the usual combine machine of the type illustrated at 10, the discharge point 49 of trough 48 is spaced somewhat rearwardly from the discharge end 50 of conveyor 34 relative to depositing material on the cleaning mechanism 36 and for purposes of our invention, we have extended trough 48 substantially forwardly to be closely adjacent the discharge end 50 of conveyor 34 and yet permit material to fall onto mechanism 36.

A beater element 51 is disposed rearwardly of cylinder 30 to act upon the material being delivered to the strawwalkers in a well-known manner.

As a regular component of this combine, a fan member 52 located below conveyor 34 is used to direct air across the cleaning mechanism 36 to float away fine chaff that may reach this point so that the clean grain can fall into the elevator 54 for delivery to tank 24. Tailings in the cleaning mechanism 36 will fall into elevator 56 for delivery back to the threshing cylinder 30 as is well known. The cleaning mechanism 36 includes the upper chaffer element 36a and the lower sieve element 36b so that the threshed material from conveyor 34 and trough 48 is first deposited on chaffer 36a where the major difficulty is encountered relative to matting and clogging.

The threshed material will contain a mixture of grain, straw, and chaff in various conditions of fineness and coarseness and the general purpose of the strawwalker and the cleaning mechanism is to separate and remove all of the extraneous matter so as to recover the clean grain for delivery to tank 24. For this purpose, the great bulk of the material which passes directly to the cleaning mechanism 36 from conveyor 34 is intended to be subjected to the airflow from fan 52 whereby the chaff will be floated away and only the clean grain recovered. Likewise, the larger pieces of straw and chaff which reach the strawwalkers are intended to be moved rearwardly out of the machine so that the heavier grain will sift through into troughs 48 for delivery to the cleaning mechanism 36. Thus, the cleaning mechanism 36 receives threshed material both from the trough 48 and from conveyor 34 for final cleaning. In this regard, the amount of fine chaff and extraneous matter which finds its way through the grate 32 as well as into troughs 48 is often quite substantial so as to pile up and clog the cleaning mechanism 36 and particularly chaffer 36a so that fan 52 cannot function efficiently because its effect is directed at the point of accumulation and not at preventing such accumulation. Accordingly, the efficiency in general of the separating process is adversely affected and much of the grain will not reach the elevator 54. In this environment, it is the primary purpose of this invention to provide an improved airflow or air pressurized system to effectively act against the chaff to prevent its being moved onto the chaffer 36a either by moving over conveyor 34 or by sifting down through the strawwalkers 38 from above and thus prevent any heavy accumulations of chaff so as to permit the cleaning mechanism to operate at its intended efficiency.

Accordingly, we have installed a twin fan assembly designated generally by the numeral 58 which includes an elongated shaft 60 having a fan member 62 secured thereto at each end portion so that each fan 62 will be mounted at respective opposite sides of housing 20 for which there are suitable openings 63 (FIG. 2) permitting said fans to draw air into the housing from opposite sides thereof. The mounting of fan assembly 58 is illustrated further in FIG. 2 to show its relative location to other working parts. Shaft 60 carries a pulley wheel 64 driven by a belt 66 which in turn engages the pulley 68 connected by belt 69 to the drive mechanism 70 for the beater unit 51. The sprocket and chain assembly 72 is associated with the elevator 54 and the drive mechanism 74 is associated with the threshing cylinder 30 as is generally understood in machines of this type. As further seen in FIG. 2, the crankshaft 46 for the strawwalker assembly 38 is operated by the drive wheel 76 and the shaft 90, which is eccentrically mounted on the drive wheel 80, is the operating mechanism for agitating the cleaning mechanism 36 referred to previously.

Figure 2:
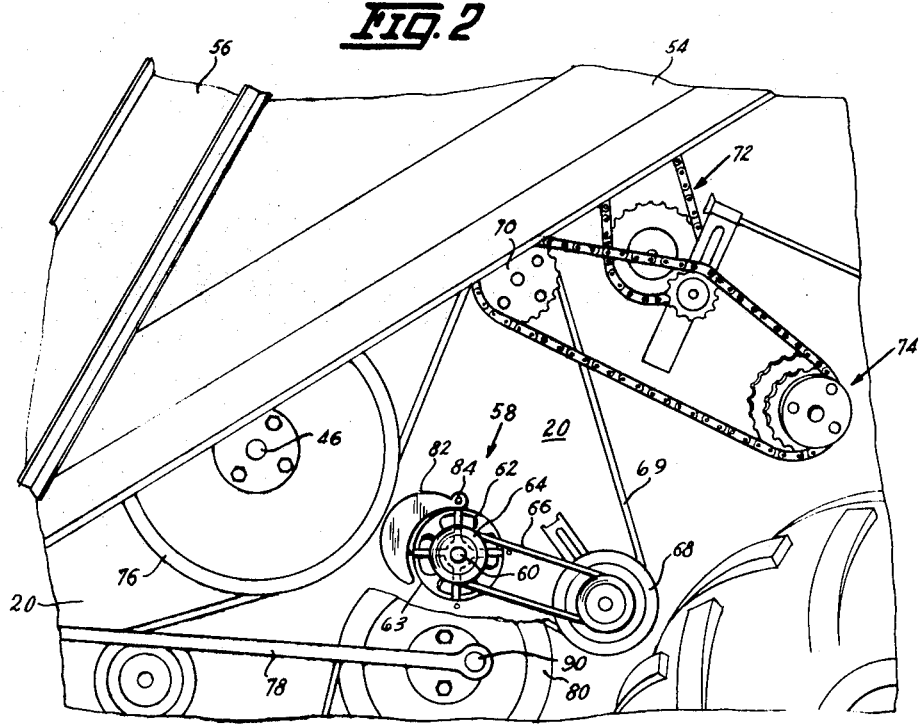
FIG. 2 is an enlarged fragmentary side elevational view showing the location of the blower structure and its operative association with other standard combine mechanism.
Figure 3:
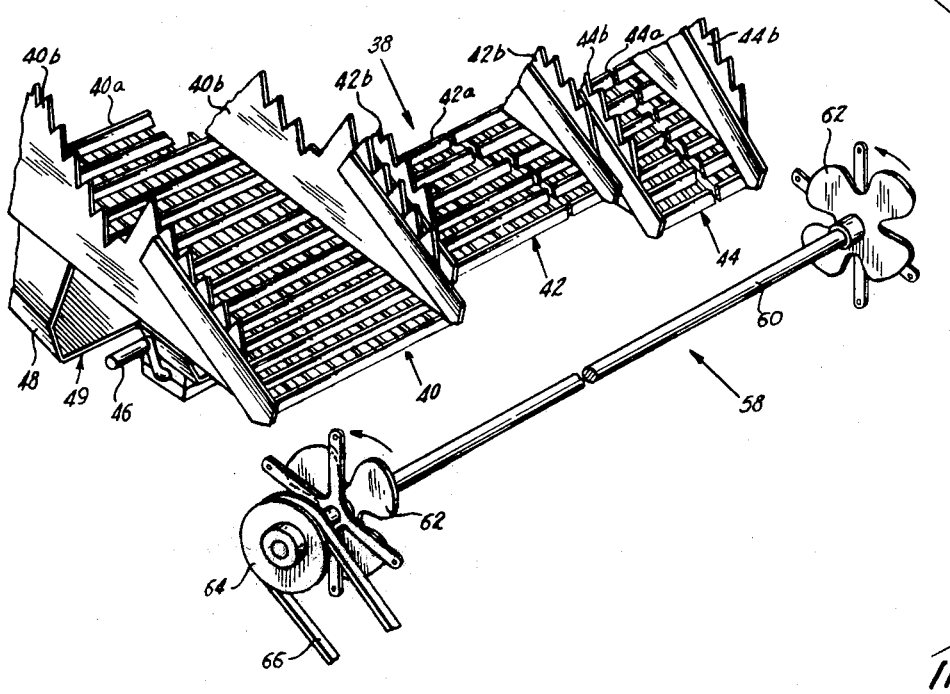
FIG. 3 is an exploded perspective view illustrating the fan structure for our air system and showing a fragmentary portion of a conventional strawwalker mechanism on which the air system of this invention will operate.
Figure 4:
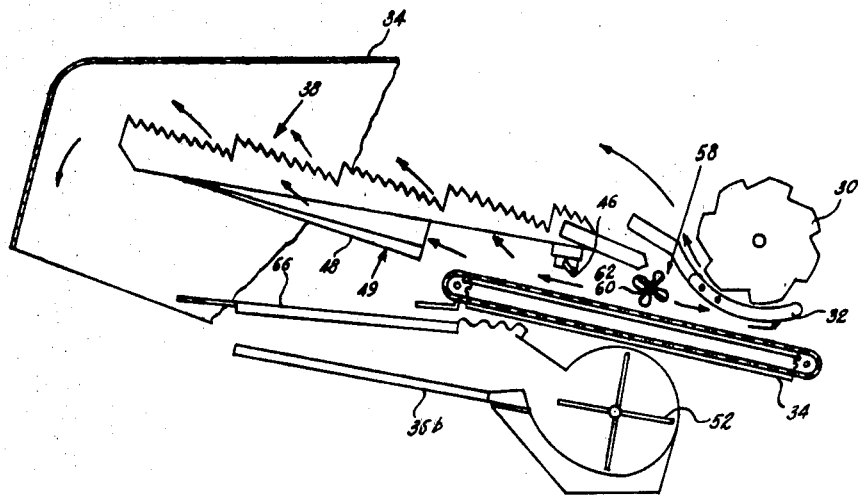
FIG. 4 is a longitudinal schematic view of the combine illustrating the several parts thereof in their operative relationship.

As best seen in FIG. 1, the fan assembly 58 is disposed just above the conveyor 34 and closely adjacent the rearward portion of the concave grate 32. In this position, the rotation of fan 62 in the direction of the arrow shown in FIG. 3 will result in an intake of air from opposed sides of the housing 20 to create opposing impacting streams of air which, because of the general enclosed structure of the machine, will upon impact be deflected to move rearwardly and forwardly as seen by the arrows in FIG. 4 within the housing both upwardly through the grate 32 and over the strawwalkers 38 and over the conveyor 34, up the trough 48 and upwardly through the walkers 38. The effect of fan unit 58 will be to pressurize the area beginning at the point of separation of the threshed materials which will be at the threshing cylinder 30 and this will provide for the floating away of the fine chaff that would normally find its way either to conveyor 34 or over the walkers 38. During this air movement a portion of the airflow from fan unit 58 will move directly upwardly through the trough 48 since it will be confined to this passage by the generally enclosed housing sides 20 and the extension of the trough sides 48 as previously described. The amount of air to be drawn in by fan 62 can be regulated by the arcuate plate 82 pivotally attached at one end 84 to housing 20 as seen in FIG. 2 so that it can be selectively moved over opening 63 as a cover to reduce the area through which air can pass. By this arrangement it can readily be determined how much airflow will be sufficient to float and carry away all of the lighter material without preventing the heavier grain from being delivered by conveyor 34 to the cleaning assembly 36 and as the air passes up the trough 48 it will also move upwardly through the apertures in the racks 40a, 42a and 44a of the strawwalker 38 with sufficient force so that at least the substantial portion of the chaff that would otherwise reach the mechanism 36 by this path will also be floated away, but at the same time permit the grain to fall onto the trough 48 for delivery to the cleaning mechanism 36. It will thus be appreciated that the overall effect of this fan assembly 58 is to provide a pressurized air area in and about the entire area of the separating mechanism where fine chaff would normally find its way along with the grain to the cleaning shoe.

We claim:

1. In a combine harvesting machine of a type having crop harvesting apparatus, a housing enclosing threshing and cleaning machinery which includes a threshing cylinder in crop receiving relation to said crop harvesting apparatus, a concave grate below said threshing cylinder through which the substantial portion of crops threshed by said cylinder passes, a conveyor in crop receiving relation to said concave grate, a discharge end on said conveyor, a cleaning shoe mechanism in crop receiving relation to the discharge end of said conveyor, a strawwalker separating mechanism in crop receiving relation to said threshing cylinder to receive threshed crops not passing through said concave grate, said strawwalker mechanism including a foraminous rack for threshed material to sift through and an inclined enclosed trough below said rack to receive said material and permit it to move by gravity to a discharge point, and said cleaning shoe mechanism also being in crop receiving relation to the discharge point of said trough, the improvement in said machine comprising:

airflow producing means mounted within said housing and disposed to direct an air stream toward the point of crop movement intermediate said concave grate and said conveyor whereby because of the confines of said housing said air stream moves in part forwardly over said conveyor and then upwardly through said grate and then rearwardly over said strawwalkers out of said machine to float and carry away light chaff and straw without affecting the movement of heavier grain material.

2. A device as defined in claim 1 wherein said airflow also moves in part rearwardly over said conveyor to the discharge end thereof, then up the trough of the strawwalker mechanism and upwardly through the foraminous rack thereon.

3. A device as defined in claim 2 including the discharge point on said trough being disposed so as to be closely adjacent the discharge end of said conveyor to facilitate the interception of said airflow.

4. A device as defined in claim 1 wherein said airflow producing means includes:

a shaft disposed on said machine transversely of the longitudinal axis thereof so as to extend intermediate said conveyor and said concave grate to intersect the path of movement of threshed material, a fan member secured on one end of said shaft and disposed to draw air inwardly from one side of said machine to the area of crop movement intermediate said concrete grate and said conveyor, and means for rotating said shaft.

5. A device as defined in claim 4 including a second fan member secured to the opposite end of said shaft and similarly disposed relative to the opposite side of said machine whereby said fan members act to direct opposing impacting airstreams toward said concave grate which combine to create an airflow over said conveyor, up said trough, through said rack and out of said machine and a complementary airflow upwardly through said grate, rearwardly over said strawwalkers and out of said machine.